United States Patent
Otsuka (10) Patent No.: US 7,128,870 B2
(45) Date of Patent: Oct. 31, 2006

(54) METHOD FOR THE MANUFACTURE OF MULTILAYER CERAMIC ELECTRONIC COMPONENT

(75) Inventor: Koji Otsuka, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 482 days.

(21) Appl. No.: 10/606,882

(22) Filed: Jun. 24, 2003

(65) Prior Publication Data

US 2004/0065986 A1   Apr. 8, 2004

Related U.S. Application Data

(63) Continuation of application No. 09/608,034, filed on Jun. 30, 2000, now abandoned.

(30) Foreign Application Priority Data

Jun. 30, 1999 (JP) .................................. 11-186314
Aug. 11, 1999 (JP) .................................. 11-227130

(51) Int. Cl.
  *C03B 33/34* (2006.01)
(52) U.S. Cl. ....................... 264/605; 264/656; 264/671
(58) Field of Classification Search ................ 264/605, 264/656, 671; 432/258, 259, 261
See application file for complete search history.

(56) References Cited

U.S. PATENT DOCUMENTS

| | | | |
|---|---|---|---|
| 4,784,812 A | | 11/1988 | Saitoh et al. |
| 5,406,058 A | | 4/1995 | Lipp |
| 5,419,857 A | * | 5/1995 | Van den Sype ............ 264/40.1 |
| 5,868,884 A | * | 2/1999 | Oiwa et al. ............... 156/89.16 |
| 5,997,795 A | | 12/1999 | Danforth et al. |
| 6,004,624 A | | 12/1999 | Bates et al. |
| 6,069,103 A | | 5/2000 | Kwon |
| 6,142,774 A | | 11/2000 | Brands et al. |
| 6,156,246 A | | 12/2000 | Chatterjee et al. |

FOREIGN PATENT DOCUMENTS

JP    9-129481    5/1997

OTHER PUBLICATIONS

Machine translation of JP 09-129481 retrieved from http://www19.ipdl.ncipi.go.jp on Apr. 17, 2006.*
Korean Office Action dated Dec. 8, 2005 with partial translation.

* cited by examiner

*Primary Examiner*—Carlos Lopez
(74) *Attorney, Agent, or Firm*—Katten Muchin Rosenman LLP

(57) ABSTRACT

A method for manufacturing multilayer ceramic electronic components includes the steps of removing organic materials from multilayer ceramic bodies having internal electrodes and ceramic layers, and then sintering the multilayer ceramic bodies. After finishing the removing step, it is preferable that the amount of the remaining organic materials in the multilayer ceramic body is 0.5 to 8.5 weight %, more preferably 1.0 to 5.0 weight %. The removing process may be performed in a neutral, a reductive or inert atmosphere. It is also preferable that the organic materials removing temperature of the internal electrodes are controlled to be higher than that of the ceramic layer.

6 Claims, 5 Drawing Sheets

METHOD FOR THE MANUFACTURE OF MULTILAYER CERAMIC ELECTRONIC COMPONENT

CROSS-REFERENCE TO RELATED APPLICATION

This is a continuation of U.S. application Ser. No. 09/608,034 filed on Jun. 30, 2000, now abandoned.

FIELD OF THE INVENTION

The present invention relates to a method for manufacturing a multilayer ceramic electronic component, e.g., a multilayer ceramic capacitor; and, more particularly, to a method for manufacturing a multilayer ceramic electronic component by performing the removal of organic materials from multilayer ceramic bodies before sintering.

DESCRIPTION OF THE PRIOR ART

A multilayer ceramic electronic component such as multilayer ceramic capacitor includes stacked ceramic layers and internal electrodes in the form of a conductive film disposed therebetween. In manufacturing such a multilayer ceramic electronic component, bare ceramic green sheets are fabricated first from a slurry obtained by mixing ceramic powders with a binder solution including therein an organic binder, a dispersing agent and a solvent. Internal electrode patterns are then printed on the ceramic green sheets by using screen printing technique and the ceramic green sheets having thereon internal electrode patterns are stacked to form a ceramic body. The resultant laminated ceramic body is then diced into a plurality of chip-shaped multilayer ceramic bodies. These chip-shaped multilayer ceramic bodies are sintered after removing the organic materials such as a organic binder and a solvent.

However, after the removal of organic materials by the binder-removing process, the unsintered ceramic bodies become brittle and are liable to structural defects such as cracks during the subsequent sintering process.

Another problem arises during the removal of the organic materials. When removing the organic materials from the unsintered ceramic bodies in a binder-removing furnace, it is difficult to maintain a uniform atmospheric condition in the furnace; and because of the resultant local variations in the atmosphere of the furnace, the amount of organic materials removed from each unsintered ceramic body varies depending on the locations thereof. Consequently, amounts of the organic materials remaining in the unsintered ceramic bodies become different depending on their locations, entailing the augmented variations of the electrical properties of the multilayer ceramic electronic components after subjecting binder-removed ceramic bodies to the subsequent sintering process.

SUMMARY OF THE INVENTION

It is, therefore, an object of the invention to provide a method capable of manufacturing multilayer ceramic electronic components that have less structural defects and uniform electrical properties by removing organic materials from each ceramic body in a controlled uniform manner during a binder-removing process.

In accordance with a preferred embodiment of the present invention, there is provided a method comprising the steps of removing organic materials from unsintered multilayer ceramic bodies to provide binder-removed ceramic bodies, and sintering the binder-removed ceramic bodies, wherein the amount of organic materials remaining in each binder-removed ceramic body is about 0.5 weight % to about 8.5 weigh %, and more preferably, about 1.0 weight % to 5.0 weight %.

In accordance with another preferred embodiment of the invention, there is provided a method for manufacturing multilayer ceramic electronic components, comprising the steps of removing organic materials from unsintered multilayer ceramic bodies having ceramic layers and internal electrodes, and sintering the binder-removed multilayer ceramic bodies, wherein the removal of organic materials from the internal electrodes starts at a higher temperature than the ceramic layers.

That is, in the binder-removing process, the removal of the organic materials starts first from a portion of the ceramic layers near the surfaces of the ceramic bodies; and then the organic materials in the internal electrodes, which are located comparatively inner position, are removed thereafter. Therefore, the uniform removal of the organic materials can be achieved.

It is preferable that the binder removal starting temperature of the internal electrodes is higher than that of the ceramic layers by more than about 5° C., and more preferably, by more than about 10° C. When the difference between the binder removal starting temperatures is too small, the removal of the organic materials may not be performed uniformly throughout each ceramic body. The binder removal starting temperature is determined not only by the binder itself but also by the other species mixed together therewith. For instance, when the binders are mixed with ceramic materials or conductive electrode materials, the binder removal starting temperatures become lowered by the catalytic action of the hydroxyl radical, which effect should be considered.

In accordance with still another preferred embodiment of the present invention, there is provided a method for manufacturing multilayer ceramic electronic components, comprising the steps of removing organic materials from unsintered multilayer ceramic bodies and sintering the binder-removed multilayer ceramic bodies, wherein a vessel having meshes smaller than the size of each ceramic body is used during the binder-removing process.

The unsintered ceramic bodies are charged in vessels each having smaller meshes than the size of each unsintered multilayer ceramic body before they are loaded into the binder-removing furnace. By using the meshed vessel described above, the ceramic bodies can contact uniformly with the atmosphere gases, enabling the removal of the organic binders from each ceramic body to occur uniformly. Further, meshed shelves may be used for arranging the ceramic bodies in the furnace, in which case the ceramic bodies can be disposed directly on the shelves. It is preferable that the size of mesh is smaller than that of a ceramic body in order to prevent the ceramic bodies from falling off the vessels or shelves. For example, for the binder-removing process of the ceramic bodies of the types 1005–3216(1 mm×0.5 mm–3.2 mm×1.6 mm), it is preferable to use vessels or shelves of 20–100 mesh.

Further, the binder-removing process is preferably performed under a pressure higher than that of ambient air, through which the stable furnace atmosphere can be maintained without being affected by the ambient air which can intrude into the furnace.

BRIEF DESCRIPTION OF THE DRAWINGS

The above and other objects and features advantages of the present invention will become apparent from the following description given in conjunction with the accompanying drawings, wherein.

DETAILED DESCRIPTION OF THE PREFERRED EMBODIMENTS

The preferred embodiments of the present invention will now be described in detail with reference to a multilayer ceramic capacitor.

The major constituent of the raw materials of the dielectric being used for forming ceramic layers of typical multilayer ceramic capacitor is $BaTiO_3$. Normally, glass components mainly composed of $Si_2O_3$, $B_2O_3$ and/or $Li_2O_3$ are also added in order to lower the sintering temperature. Oxides of rare-earth elements such as Y, La, Ce, Pr, Nd, Pm, Sm, Eu, Gd, Tb, Dy, Ho, Er, Tm, Yb or Lu, or transition metals, e.g., Sc, Ti, V, Cr, Mn, Fe, Co or Ni are also preferably added to the composition in order to tailor the resistance to reduction or temperature characteristics.

An exemplary process for preparing a dielectric composition for forming ceramic layers of the multilayer ceramic capacitor is as follows:

First, the predetermined amounts of starting materials are mixed in, e.g., a ball mill with water. Thereafter the mixture is dried by a spray drier or the like and calcined at a temperature ranged from, e.g., about 800° C. to about 1300° C. for about 2 to about 10 hours to obtain dielectric oxides, which are then ground in a ball mill, jet mill or the like into particles of desired sizes.

Next, a slurry is prepared by mixing the ground dielectric material obtained above with an organic binder and a solvent, e.g., in a ball mill, a basket mill or a bead mill. A plasticizer and a dispersing agent may be added, if necessary.

The binder may be selected from, e.g., abietic resin, polyvinyl butyral, ethyl cellulose or acrylic resin. The solvent may be selected from, e.g., ethanol, terpineol, butyl carbitol, toluene or kerosene. The plasticizer may be selected from, e.g., abietic acid derivative, diethyl oxalic acid, polyethylene glycol, polyalkylene glycol, phthalate ester or dibuthyl phthalate. The dispersing agent may be selected from, e.g., glycerin, octadecyl amine, trichloroacetic acid, oleic acid, octadiene, ethyl oleate, glycerol monooleate, glycerol trioleate or glycerol tristearate.

The slurry is typically composed of 30–80 weight % of dielectric material, 2–5 weight % of binder, 0.1–5 weight % of plasticizer, 0.1–5 weight % of dispersing agent and 20–70 weight % of solvent.

Figure 1:
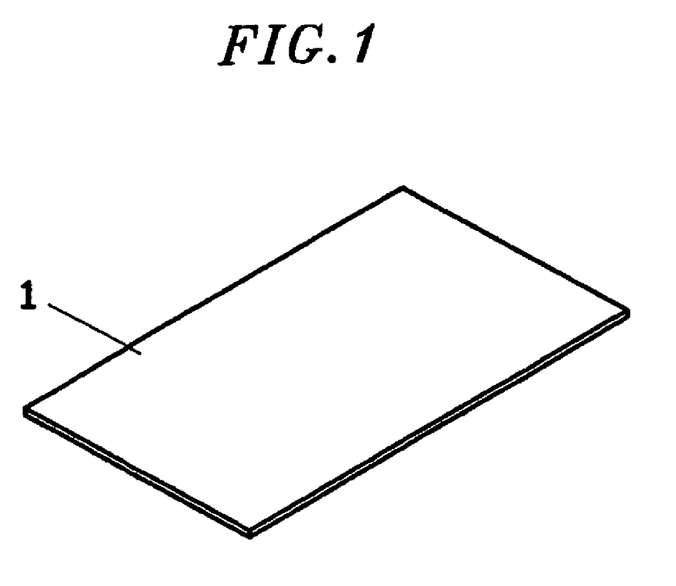
FIG. 1 is a perspective view of a bare ceramic green sheet.

Thereafter, ceramic green sheets of about 1 µm to about 20 µm thickness are formed from the slurry by using, for example, a doctor blade, a die coater or a reverse coater. These ceramic green sheets are then cut into a number of bare ceramic green sheets 1 of a desired size as shown in FIG. 1. Then, as shown in FIG. 2, internal electrode patterns 2a, 2b are printed on the surfaces of ceramic green sheets 1a, 1b.

A paste for the internal electrodes is prepared by mixing a conductive material with organic materials. The conductive material may be selected from base metals such as Ni, Cu, or a compound or a mixture thereof. There are no particular restrictions on the shape of these materials; and, for example, materials of a sphere-shape, a ring-shape or the mixture thereof may be used. The mean particle size of the conductive material is about 0.1 to about 10 µm, and preferably about 0.1 to about 1 µm. The organic materials include a binder and a solvent. The binder may be selected from ethyl cellulose, acrylic resin, butyl resin, or any other conventional binder and may be included by 1–10 weight %. The solvent may be selected from terpineol, butyl carbitol, kerosene, or any other conventional solvent; and may be included by 20 to 55 weight %. The paste may also contain additives of less than 10 weight %, which includes, e.g., a dispersing agent such as sorbitan fatty acid ester and glycerin fatty acid ester, a plasticizer such as dioctyl phthalate, dibutyl phthalate and butyl phtharyl glicoric butyl; and/or various kinds of ceramic powders, e.g., dielectric or insulation materials for preventing delamination and sintering of the electrode patterns. An organic metal resinate may also be included in the additives.

Figure 2:
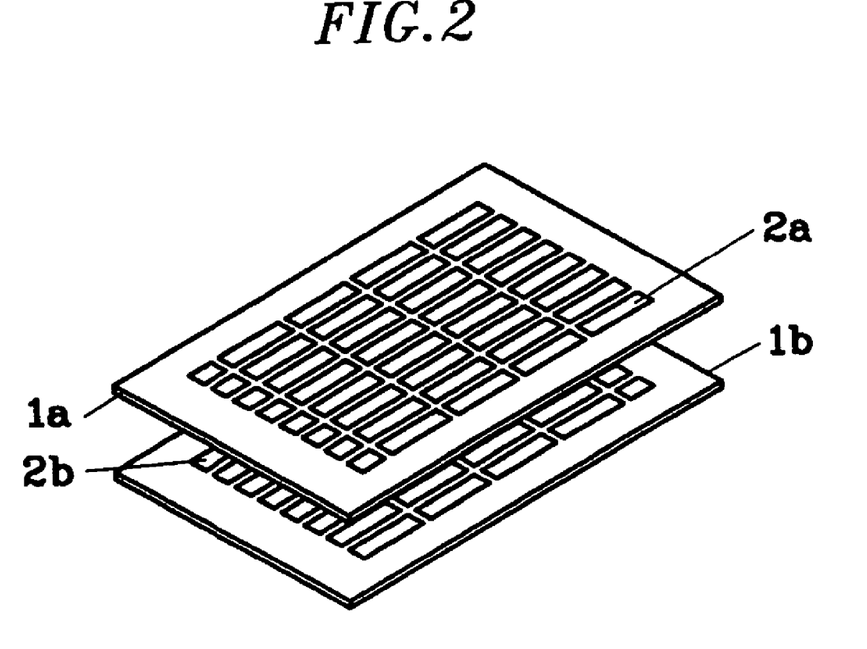
FIG. 2 shows two ceramic green sheets with the different internal electrode patterns printed thereon.

The paste for the internal electrodes is printed onto the surfaces of the ceramic green sheets to form two types of patterns 2a, 2b as shown in FIG. 2 via a printing method, a pattern transferring method or a sheeting method. In FIG. 2, the ceramic green sheets having the internal electrode patterns 2a, 2b printed thereon are labeled as 1a, 1b in order to distinguish them from the bare ceramic green sheets 1 having no internal electrode patterns thereon.

Figure 3:
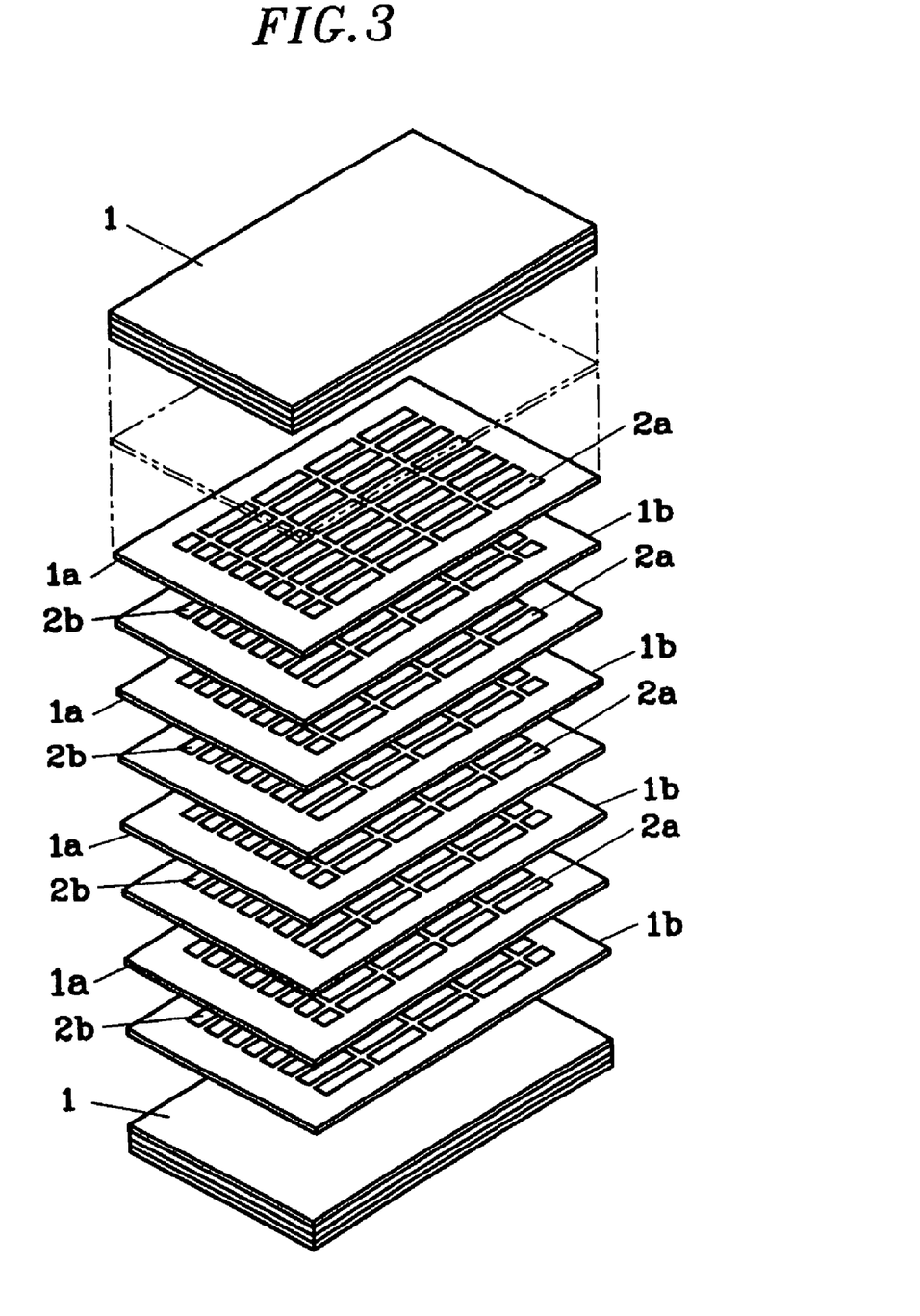
FIG. 3 illustrates a perspective exploded view of the laminated ceramic body shown in FIG. 3.
Figure 4:
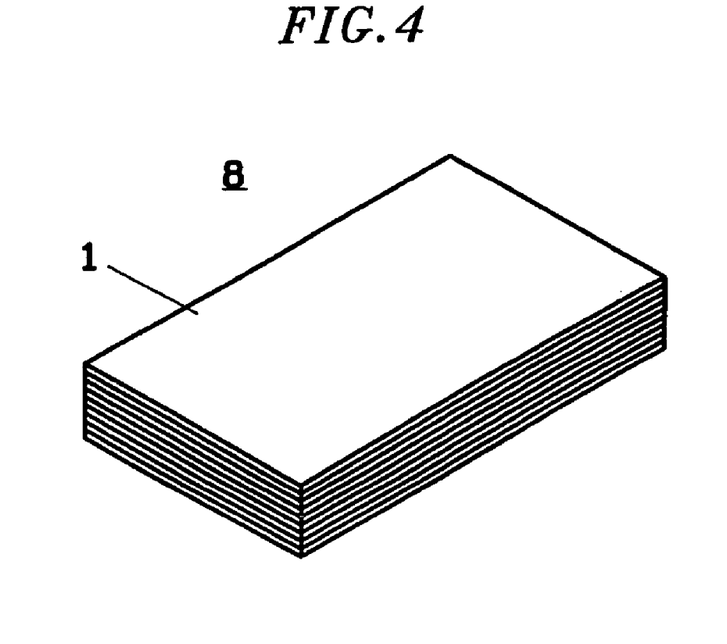
FIG. 4 presents a perspective view of the laminated ceramic body shown in FIG. 3.

The two types of ceramic green sheets 1a, 1b with different internal electrode patterns 2a, 2b are stacked alternately; and the bare ceramic green sheets 1 without the internal electrode patterns are stacked against the outermost sheets of the stacked ceramic sheets 1a and 1b, as shown in FIG. 3. Thereafter, these stacked ceramic green sheets 1, 1a and 1b are pressed to form a laminated ceramic body 8 shown in FIG. 4. The laminated ceramic body 8 may also be formed by the so-called slurry built method wherein the laminated ceramic body is fabricated by forming and printing ceramic green sheets and internal electrode patterns in a desired order on a starting ceramic green sheet.

Figure 5:
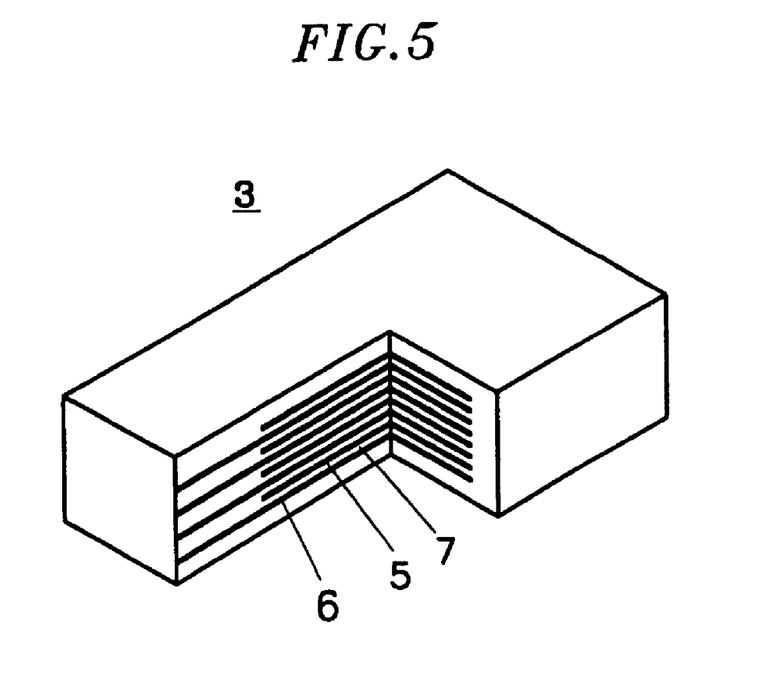
FIG. 5 depicts a partial sectional view of a multilayer ceramic body formed by dicing the laminated ceramic body in FIG. 4.
Figure 6:
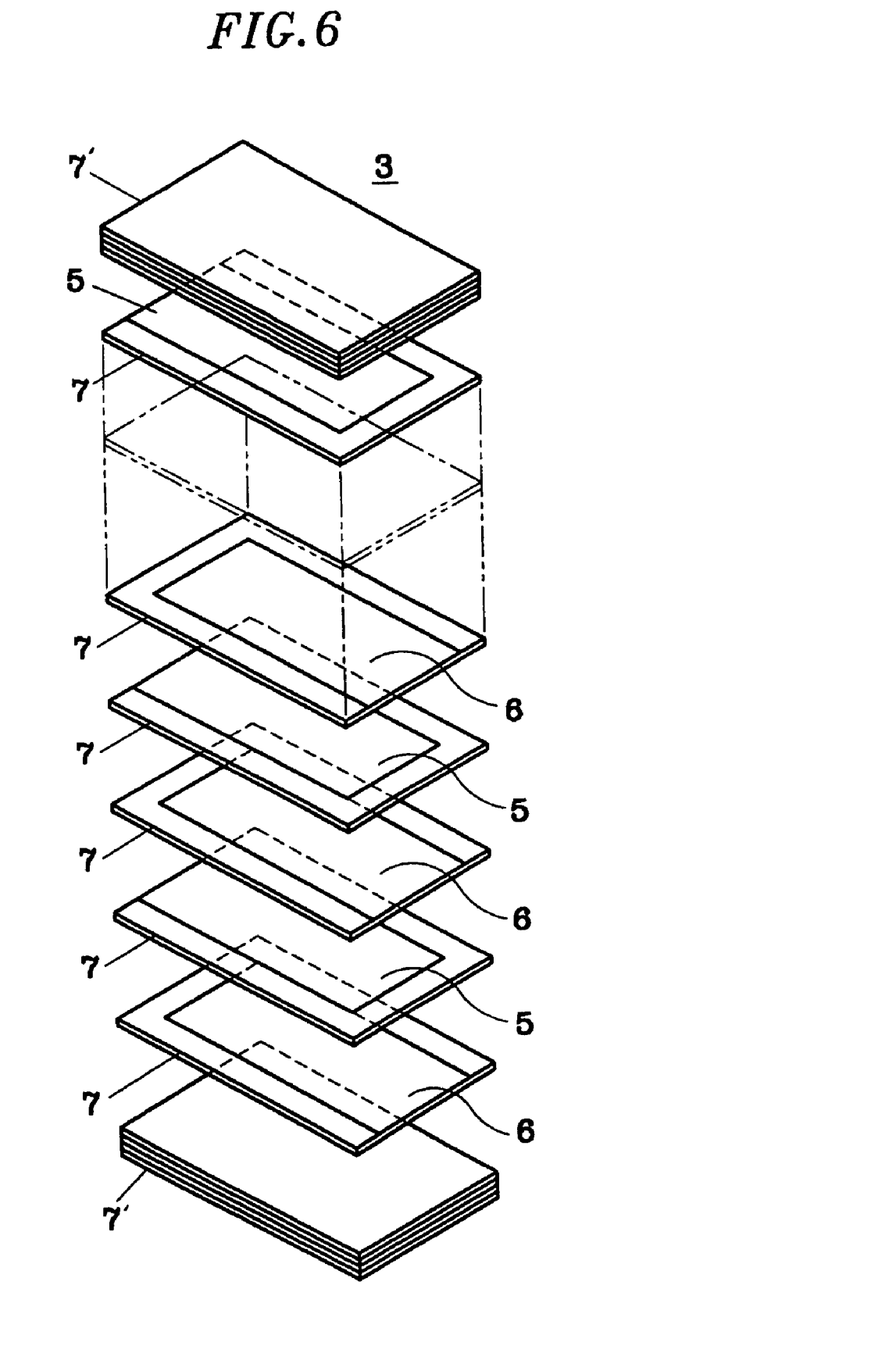
FIG. 6 represents a perspective exploded view of the unsintered multilayer ceramic body shown in FIG. 5.

The laminated ceramic body 8 is diced into unsintered multilayer ceramic bodies 3 as shown in FIG. 5. Each unsintered multilayer ceramic body 3 includes a plurality of ceramic layers 7 having, respectively, alternating internal electrodes 5, 6 exposed on two opposite sides, as shown in FIG. 6. Stacked on each of two outermost layers of the stacked ceramic layers 7 are a multiplicity of bare ceramic layers 7' having no internal electrodes thereon.

The shape or sizes of these chip-shaped ceramic bodies are determined according to the use or purpose of the multilayer ceramic capacitor. For instance, the size of a hexahedron-shaped multilayer ceramic chip capacitor is normally 1.0–3.2 mm×0.5–1.6 mm×0.5–1.6 mm.

Subsequently, the multilayer ceramic bodies 3 are subjected to a binder-removing process and a sintering process.

The binder-removing step will now be described in detail. The term "binder-removing" used herein denotes a process for removing most of the organic materials including the binder and the other organic components contained in the multilayer ceramic bodies 3 but leaving a controlled amount thereof in the multilayer ceramic bodies 3.

In the binder-removing process, the diced chip-shaped ceramic bodies 3 are loaded into a binder-removing furnace. The vessel may be of the type formed of solid alumina having zirconia coating layer thereon with an anti-adhesion agent applied to the surface of the zirconia coating layer in order to prevent the chip-shaped ceramic bodies 3 from adhering to the vessel.

However, it is preferable to use a vessel having meshes smaller than the sizes of multilayer ceramic green body 3 because the removal of the organic materials can carried out performed uniformly by using the meshed vessel.

Figure 7:
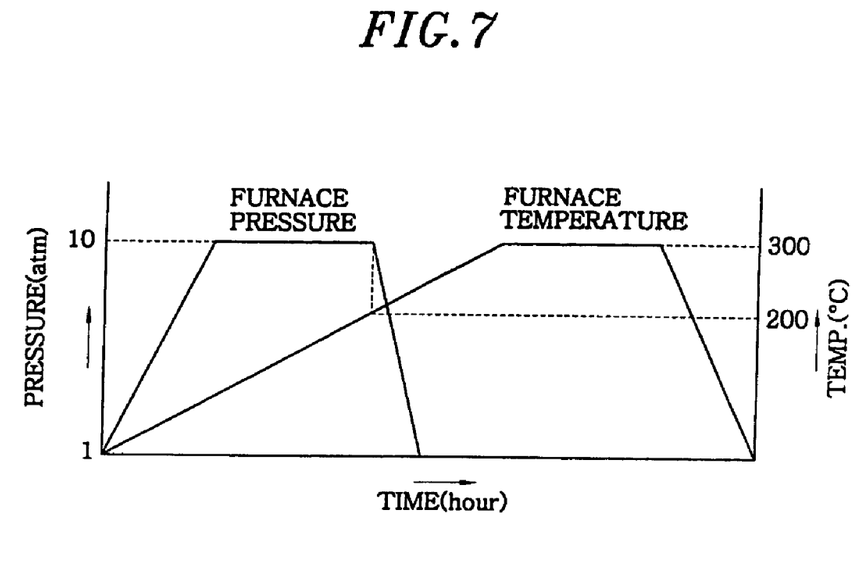
FIG. 7 provides a graph exemplifying temperature and pressure profiles of a binder-removing process schematically.

The removal of the binder can be performed under a constant pressure. However, the pressure may be changed during the binder-removing step. For instance, as shown in FIG. 7, the pressure in the furnace increases up to about 10 atm (atmosphere) and the temperature increases up to about 300° C. at a rate of about 20° C. per hour, wherein the furnace pressure increases to the maximum pressure of 10 atm before the temperature reaches 300° C. When the temperature in the furnace reaches about 200° C., the pressure decreases until it becomes about 1 atm. The binder-removing step is finished after the temperature in the furnace is maintained constant for a predetermined period of time at a peak temperature $T_p$, which is dependent on the characteristics of the binder.

The high pressure set at the beginning of the binder-removing process and the temperature at which the furnace pressure starts to decrease are determined by the characteristics of the binder, and therefore, can be different from 10 atm and 200° C. exemplified in FIG. 7.

By performing the binder-removing process as described above, organic materials in the amount of, preferably, about 0.5 weight %–about 8.5 weight %, and more preferably, about 1.0 weight %–about 5.0 weight % are left behind therein. If there remains too small an amount of organic materials in the binder-removed ceramic body, the ceramic body becomes brittle to make the handling thereof difficult. On the other hand, if the amount of organic materials left behind in the binder-removed ceramic body is too much, the atmosphere of the sintering furnace becomes unstable due to the generation of gases from the organic materials left behind after the binder-removing process.

By controlling the amount of the organic materials remaining within the organic body processed by the binder-removing process as described above, mechanical properties of the binder-removed ceramic bodies can be substantially improved, facilitating the handling of the binder-removed ceramic body and reducing the defect generation during the handling thereof. Further, generation of excessive amount of gases from the organic materials remaining in the ceramic body can be prevented during the subsequent sintering process and, therefore, the atmosphere in the sintering furnace can remain stabilized in a controlled manner, thereby preventing the non-uniformity of the sintered ceramic body from occurring.

The organic materials remaining in the binder-removed ceramic body may include any kinds of organic materials used in forming the slurry and the internal electrodes. The amount of organic material left behind in the ceramic body processed by the binder-removing process can be obtained from the recipe of the slurry and the internal electrodes and the weight difference of each ceramic body before and after the binder-removing process.

In order to prevent the delamination of the chip components including ceramic layers and/or internal electrodes and the crack generation during and/or after the sintering process, it is preferable that the removal of the organic materials be performed by pyrolysis instead of burning out the organic materials. For this, it is preferable that the binder-removing step be carried out in an inert, a neutral or a reductive gaseous atmosphere by using, e.g., $H_2$, $N_2$ and/or an inert gas. The oxidation of the internal electrodes formed of a base metal (non-noble metal) paste can also be prevented under these non-oxidative conditions, and, as a result, reliable ceramic electronic components can be acquired.

Further, it is possible to tailor the binder removal starting temperatures of the ceramic layers and the internal electrodes independently by appropriately changing the recipe or the composition of the slurry and the metal paste used in forming the internal electrodes, especially binders. The term "binder removal staring temperature" used herein represents a temperature at which the removal of the organic materials in the ceramic layers or the internal electrodes starts to take place. Specifically, by adjusting in the manner described above, the binder removal starting temperature of the internal electrodes to be higher than that of the ceramic layers, the removal of the organic materials included in the internal electrodes can be made to start after the removal of the binder included in the ceramic layers. Therefore, it becomes possible to achieve a uniform removal of the organic materials throughout each ceramic body.

After the binder-removing step, the binder-removed ceramic bodies are sintered in a tunnel furnace or a box furnace.

Figure 8:
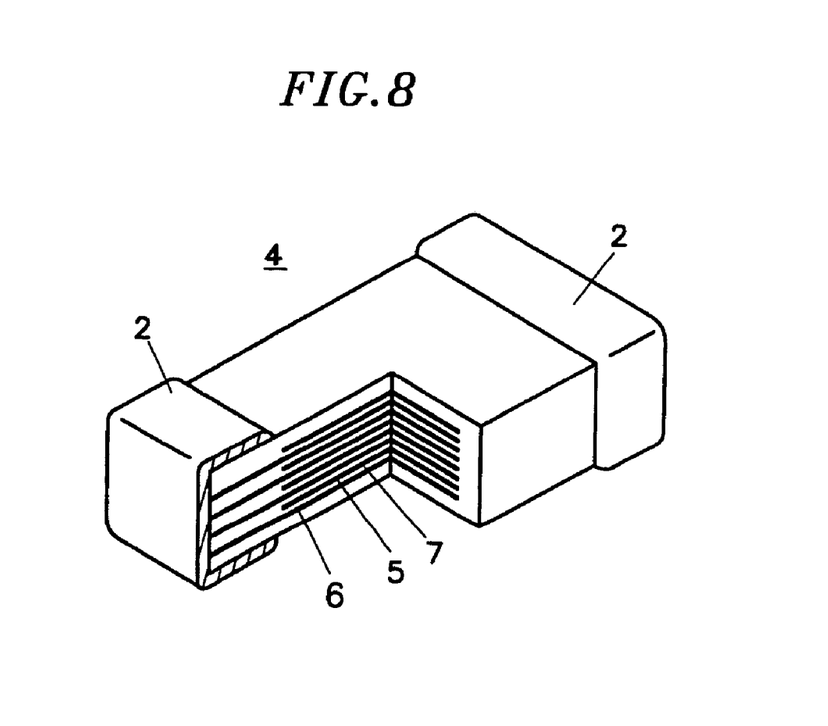
FIG. 8 offers a partial sectional view of a finished multilayer ceramic electronic component.

As shown in FIG. 8, external electrodes 2 are formed at two opposite end portions of a sintered ceramic body 4, where the internal electrodes 5 and 6 are exposed. Typically, conductive materials for use in forming the external electrodes 2 may be selected from, e.g., Ni, a Ni alloy, Cu or Cu alloy. The external electrodes 2 may also be formed by applying a conductive paste to two end portions of the sintered ceramic body 4 by a dipping method, and subsequently, subjecting the resultant sintered ceramic body to a baking process of the conductive paste in a neutral or a reductive atmosphere at a temperature ranged 600–1000° C. The external electrodes 2 may be formed by applying first the conductive paste on the ceramic body, prior to the sintering process and sintering the ceramic body having thereon conductive paste.

Dry deposition method such as the evaporation or the sputtering technique can also be employed in forming the external electrodes.

The present invention has been described with respect to the multilayer ceramic capacitors. However, it should be appreciated to those skilled in the art that the present invention can be equally applied any other types of multilayer ceramic electronic components, including multilayer ceramic inductors and multilayer ceramic composite components, having various ceramic materials and internal electrode patterns with different stacking sequences.

The present invention will be described in more detail by way of examples.

EXAMPLE 1

Example 1 will be described first. A pot mill was charged with alumina balls and 2.5 liters of water and previously synthesized oxide materials including 0.96 part by mole of $BaTiO_3$, 0.05 part by mole of MgO having purity of 99% or higher, 0.01 part by mole of ZnO, 0.03 part by mole of $TiO_2$ and 0.005 part by mole of $Ho_2O_3$, and the resulting mixture was stirred for 15 hours.

The stirred mixture was charged into a stainless pot and dried at 150° C. for 4 hours with a hot air dryer; and the dried mixture was pulverized into coarse particles, the resultant particles were then calcined in air at approximately 1200° C. for 2 hours in a tunnel furnace, thereby producing powder of the first basic component.

Thereafter, 98 parts by mole of the powder of the first component and 2 parts by mole of powder of $CaZrO_3$ (the second basic component) were weighed, and 2 parts by weight of an additive component (0.20 $Li_2O$—0.60 $SiO_2$—0.04 SrO—0.10 MgO—0.06 ZnO) were added to 100 parts by weight of the mixture of the basic components. In addition, 15 weight % of an organic binder including a butyral based resin and 50 weight % of ethanol were added to the mixture of the basic and the additive components, the weight % of the binder and said ethanol being measured with respect to the total weight of the mixture of the basic and the additive components. The resulting mixture was then ground and mixed in a ball mill to form a slurry.

The slurry was transferred to a reverse roll coater, thereby forming a thin coat on a long polyester film. The thin coat formed on the polyester film was then heated and dried at 100° C., thereby yielding a bare ceramic green sheet having a film thickness of approximately 20 μm. The sheet was then cut into a plurality of square sheets having 10 cm×10 cm.

The conductive paste for the internal electrodes was prepared by dissolving 10 g of nickel powder having an average particle size of 1.0 μm and 0.9 g of ethyl cellulose in 9.1 g of butyl carbitol and stirring the mixture for 10 hours with a stirrer. The resulting conductive paste was printed on one side of the ceramic green sheet through a screen having a predetermined pattern and then dried.

Thereafter, 33 sheets of such ceramic green sheets were stacked with their printed sides directed upward. Two adjacent sheets were arranged in a manner that the upper sheet is shifted from the lower sheet by about one half of one pattern size along the lengthwise direction, thereby forming a laminated body. Further, a plurality of bare ceramic green sheets without the internal electrode patterns thereon were stacked on each of the top and bottom surfaces of the laminated body, and then pressed with a vertical load of approximately 40 tons at a temperature of about 50° C. Thereafter, the resulting laminated ceramic body was diced into unsintered multilayer ceramic bodies.

The unsintered multilayer ceramic bodies were placed on stainless mesh plates of 20 cm×20 cm in size of 30 meshes and then charged in a binder-removing furnace. The furnace was under the atmosphere of $N_2$ and a pressure of 1.2 atm. The temperature of the atmosphere within the furnace was elevated up to 350° C. at the rate of 50° C. per hour, maintained at that point for 2 hours, and decreased down to room temperature at the rate of 50° C. per hour, thereby removing organic materials including the binder.

Thereafter, the atmosphere in the furnace was changed to a reductive atmosphere including $H_2$(2 volume %)+$N_2$(98 volume %). Under such reductive atmosphere, the multilayer ceramic bodies were heated up to a sintering temperature of 1200° C. with the ramping rate of 100° C. per hour. The temperature was maintained at the maximum point, i.e. 1200° C. for three hours, and then cooled down to 600° C. at the decreasing rate of 100° C. per hour. Also, the atmosphere in the furnace was changed to air (oxidative atmosphere) and oxidation was carried out at 600° C. for 30 minutes. Thereafter, the multilayer ceramic bodies were cooled down to room temperature, thereby yielding sintered ceramic bodies.

Subsequently, two end portions including the side surfaces of the sintered ceramic bodies where the internal electrodes were exposed were coated with a conductive paste including copper, glass frit and a vehicle, and then dried. The sintered ceramic bodies were baked at 650° C. for 15 minutes in air, thereby forming copper electrode layers. Next, nickel layers were plated on the copper electrode layers by means of an electroless plating method, and Pb—Sn soldering layers were formed thereon by means of an electroplating method, thereby forming a pair of external electrodes.

From the finished multilayer ceramic capacitors, 50 capacitors were randomly selected and their capacitances were measured under the condition of 20° C. of temperature, 1 kHz of frequency and 1.0 V of voltage by using HP4284A from Hewlett-Packard. Thereafter, the mean (X) and the standard deviation (σ) of the measured capacitances were calculated. The finished multilayer ceramic capacitors were determined as acceptable when a value (capacitance deviation) calculated by a below equation was within 3% or less.

σ(standard deviation)/X(mean)×100

In order to determine the defect generation in the finished capacitors, 1000 random capacitors were selected and inspected by an optical microscope. The results are shown in Table 1. In Table 1, each examples with a mark "*" are a comparative example exhibiting unacceptable result. The parameters in Table 1 were obtained as follows:

TABLE 1

| Example No. | Remaining amount of organic materials (%) | Difference of binder removal starting temperatures (° C.) | Vessel type | Atmosphere | Pressure (atm) | Capacitance Deviation (%) | Defect Generation Rate (%) |
|---|---|---|---|---|---|---|---|
| 1 | 3.1 | 20 | Meshed | $N_2$ | 1.2 | 1.23 | 0.0 |
| *2 | 0.3 | 20 | Meshed | $N_2$ | 1.2 | 0.54 | 3.0 |
| 3 | 0.5 | 20 | Meshed | $N_2$ | 1.2 | 0.74 | 0.9 |
| 4 | 1.0 | 20 | Meshed | $N_2$ | 1.2 | 0.98 | 0.3 |

TABLE 1-continued

| Example No. | Remaining amount of organic materials (%) | Difference of binder removal starting temperatures (° C.) | Vessel type | Atmosphere | Pressure (atm) | Capacitance Deviation (%) | Defect Generation Rate (%) |
|---|---|---|---|---|---|---|---|
| 5 | 4.9 | 20 | Meshed | $N_2$ | 1.2 | 1.82 | 0.0 |
| 6 | 8.6 | 20 | Meshed | $N_2$ | 1.2 | 2.91 | 0.0 |
| * 7 | 10.1 | 20 | Meshed | $N_2$ | 1.2 | 5.13 | 0.0 |
| * 8 | 4.0 | 3 | Meshed | $N_2$ | 1.2 | 3.32 | 0.2 |
| 9 | 4.1 | 5 | Meshed | $N_2$ | 1.2 | 2.88 | 0.1 |
| 10 | 3.9 | 10 | Meshed | $N_2$ | 1.2 | 1.76 | 0.0 |
| 11 | 3.2 | 20 | Solid | $N_2$ | 1.2 | 2.89 | 0.4 |
| 12 | 3.2 | 20 | Meshed | Air | 1.2 | 2.98 | 0.8 |
| 13 | 2.9 | 20 | Meshed | $N_2$ | 1.0 | 2.61 | 0.1 |

In order to determine the amount of the organic materials remaining in the binder-removed ceramic bodies, at first, the amount of the organic materials except the solvent components originally included in the unsintered ceramic bodies were calculated from the contents of the starting materials used in forming the slurry and the internal electrode paste. It was assumed that all the solvents included in the slurry and the internal electrode paste evaporates during the process of forming the ceramic green sheets and the internal electrode patterns therefrom, respectively. Then, the weight difference of the ceramic bodies before and after the binder-removing step was measured. It was also assumed that the weight difference is the amount of the removed organic materials, and the remaining amount of the organic materials was determined by subtracting the weight difference from the original amount of the organic materials except the solvent components calculated above. The weight percent of the remaining organic materials are then calculated by dividing the remaining amount of the organic materials by the weight of the binder-removed ceramic bodies.

The starting temperatures of binder-removing process in the internal electrodes and the ceramic layers were measured by DTA (Differential Thermal Analysis) method, respectively. DTA measurement was performed with the ramping rate of 20° C. per minutes until the binder-removing step was finished. In Table 1, the term "differences of the binder removal starting temperatures" refers to the differences between the binder removal starting temperatures of the internal electrodes and those of the ceramic layers.

The pressure was measured by a manometer.

In examples 2–7, the temperatures maintained constant during the removal of the binder were different from those of example 1.

In example 8 and 9, the abovementioned temperatures as well as the degrees of polymerization of the binders for internal electrodes and ceramic layers were different from those of example 1.

In example 11, solid ceramic vessels without meshes were used during the removal of the binder instead of the metal vessel with meshes used in example 1.

In example 12, the atmosphere in the binder-removing process was changed to air.

In example 13, the pressure in the binder-removing furnace was changed to 1 atm.

As shown in Table 1, when the remaining amounts of the organic materials are within the range of about 0.5 weight % to 8.5 weight % of the binder-removed organic bodies, the capacitance deviation may fall within 3.0% or below, and defect generation rates can be below 1.0%. Moreover, when the remaining amounts of the organic materials are within the range of about 1.0 weight % to about 5.0 weight %, the capacitance deviation can be within 2.0% or below, and the defect generation rates can be below 0.3%.

Further, when the binder removal starting temperatures of the internal electrodes were higher than those of the ceramic layers by about 5° C., the capacitance deviation are within 3% or below.

Moreover, the capacitance deviations were not greater than 3% by using the meshed vessel.

It is also noted that the capacitance deviations can also be further reduced by keeping the pressure in the furnace higher than 1 atm or forming a neutral atmosphere in the furnace during the removal of the binder, while maintaining the conditions described above.

Although the invention has been shown and described with respect to the preferred embodiments, it will be understood by those skilled in the art that various changes and modifications may be made without departing from the spirit and scope of the invention as defined in the following claims.

What is claimed is:

1. A method for manufacturing a multilayer ceramic electronic component, comprising the steps of:

preparing an unsintered multilayer ceramic body including stacked ceramic layers and internal electrodes, the internal electrodes being made mainly of a base metal;

removing organic materials from the unsintered multilayer ceramic body to provide a binder-removed multilayer ceramic body; and sintering the binder-removed multilayer ceramic body under a reductive atmosphere, wherein the amount of the organic materials remaining in the binder-removed multilayer ceramic body ranges from about 0.5 weight % to about 8.5 weight % of the binder-removed multilayer ceramic body, and wherein the removal of the organic materials from the internal electrodes starts at a temperature higher than that employed for the removal of the organic materials from the ceramic layers in order to remove the organic materials uniformly throughout the unsintered multilayer ceramic body.

2. The method of claim 1, wherein the removal of the organic materials from the internal electrodes starts at a temperature higher than that employed for the removal of the organic materials from the ceramic layers by more than about 5° C.

3. The method of claim 2, wherein the removal of the organic materials from the internal electrodes starts at a temperature higher than that employed for the removal of the organic materials from the ceramic layers by more than about 1° C.

4. A method for manufacturing a multilayer ceramic electronic component, comprising the steps of:
- preparing an unsintered multilayer ceramic body including stacked ceramic layers and internal electrodes, the internal electrodes being made mainly of a base metal;
- removing organic materials from the unsintered multilayer ceramic body to provide a binder-removed multilayer ceramic body; and
- sintering the binder-removed multilayer ceramic body under a reductive atmosphere,
- wherein the amount of the organic materials remaining in the binder-removed multilayer ceramic body ranges from about 0.5 weight % to about 8.5 weight % of the binder-removed multilayer ceramic body, and wherein the removing step includes the steps of increasing a pressure in a binder removing furnace up to a peak pressure, increasing a temperature in the binder removing furnace up to a peak temperature, decreasing the pressure when the temperature reaches a pressure-decreasing temperature, which is lower than the peak temperature, and maintaining the peak temperature for a predetermined of period.

5. The method of claim 4, wherein the peak pressure is about 10 atmospheres.

6. The method of claim 4, wherein the pressure-decreasing temperature is about 200° C. and the peak temperature is about 300° C.

* * * * *